United States Patent [19]

Sedlmayer et al.

[11] 4,095,160

[45] June 13, 1978

[54] CONTROL ARRANGEMENT FOR CAUSING TRACK SUPPORTED IMPLEMENT TO REMAIN IN PARALLELISM WITH ITSELF

[75] Inventors: Franz Sedlmayer; Peter Müller, both of Wilhelmshaven, Germany

[73] Assignee: Fried. Krupp Gesellschaft mit beschrankter Haftung, Essen, Germany

[21] Appl. No.: 693,202

[22] Filed: Jun. 4, 1976

[30] Foreign Application Priority Data

Jun. 25, 1975 Germany .......................... 2528293

[51] Int. Cl.[2] ........................................ G05B 11/01

[52] U.S. Cl. .................................. 318/675; 318/85

[58] Field of Search ................ 318/675, 676, 587, 85

[56] References Cited

U.S. PATENT DOCUMENTS 3,736,880 6/1973 Ross .................................. 104/148

*Primary Examiner*—Robert K. Schaefer

*Assistant Examiner*—John J. Feldhaus

*Attorney, Agent, or Firm*—Walter Becker

[57] ABSTRACT

A control arrangement, especially for use with a track supported implement, having an elongated beam with carriages at the opposite ends supported on respective tracks in which pick-up elements on at least one of the carriages are sensitive to movement of the respective carriage in a horizontal plane and about a vertical axis on the respective track. The pick-up elements are longitudinally spaced on the curve and supply respective signals to a comparator which emits a control signal which varies as the difference between the pick-up signals varies. The control signal is employed for developing an influence on the beam tending to restore it to the condition of parallelism with itself.

7 Claims, 11 Drawing Figures

FIG. 6
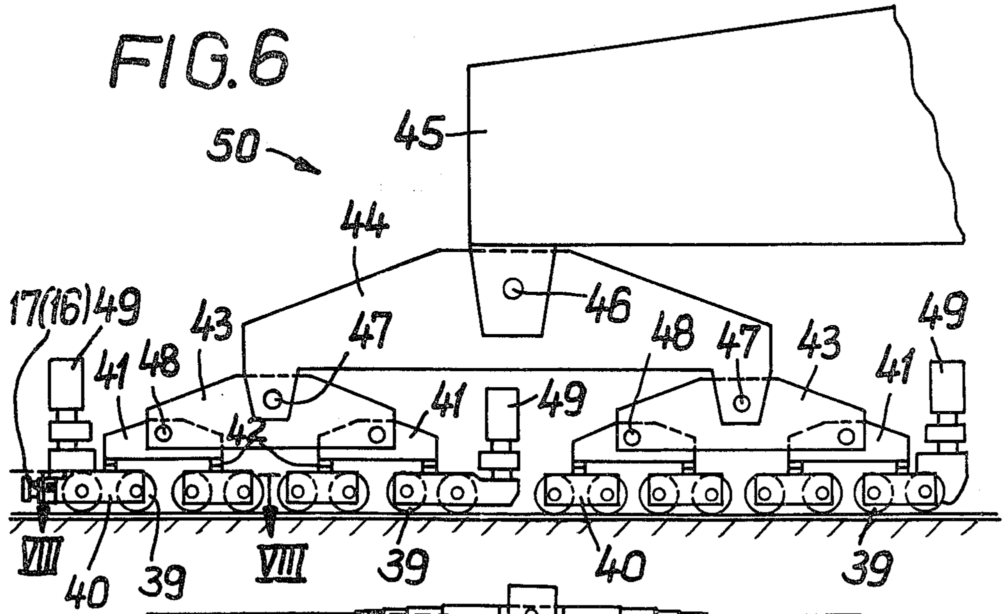
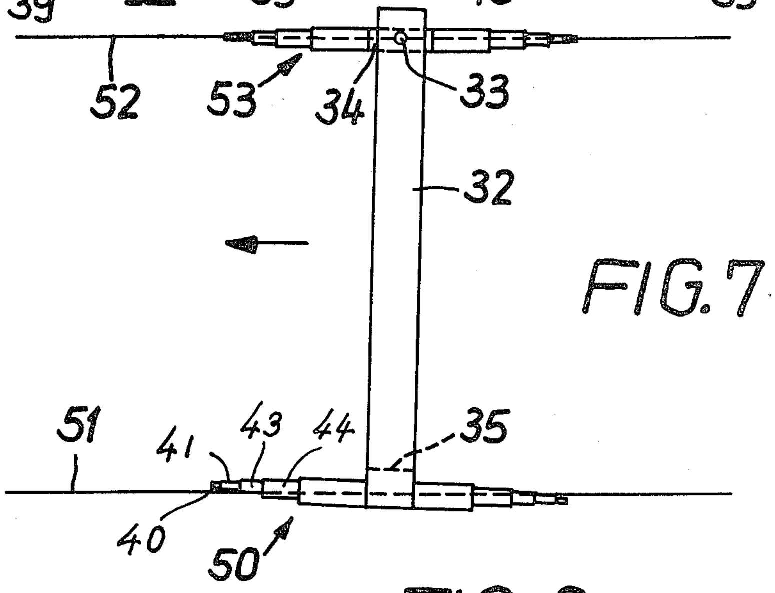
FIG. 7
FIG. 8
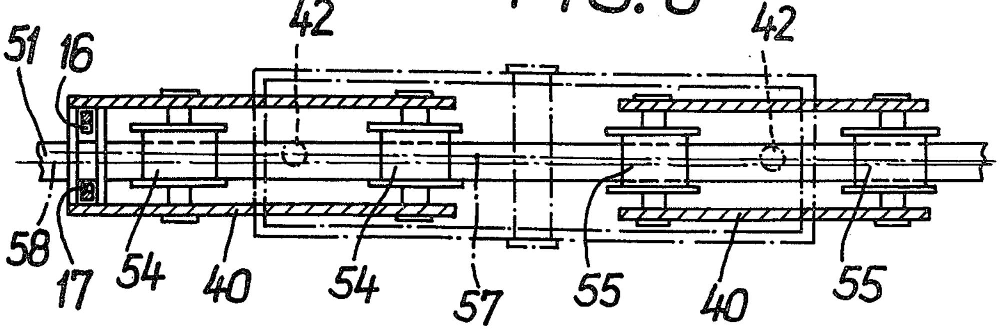

U'
21
12
22
25
U
91
90
86
92
89
23
22a
26
88
86
87
13
23a
24
93
75
78
84
85
79
76
80
81
82
78
77
27
83
74'
71
φ
74
72
70
φ
73
74''

CONTROL ARRANGEMENT FOR CAUSING TRACK SUPPORTED IMPLEMENT TO REMAIN IN PARALLELISM WITH ITSELF

The present invention relates to a straight movement control device for an implement which is equipped with a rail carriage and has a large span and a measured value pick-up mounted on the rail carriage. More specifically, the present invention relates to a control device as set forth in which the pick-up is provided with two feelers on both sides of the respective rail and is operatively connected to a governor which at the start of an inclined position of the rail carraige relative to the rail emits a signal to a driving medium of the device whereby the straight movement is restored.

According to a device of the type involved and described in German Pat. No. 1,073,708, the feelers comprise two discs which are mounted on a shaft which is displaceable transverse to the rail and is arranged on the rail carriage. When the rail carriage occupies an inclined position relative to the rail in one direction, one of the two discs engages the rail so that the shaft can no longer take part in the transverse movement of the rail carriage relative to the rail. Consequently variable resistors mounted on the rail carriage are displaced relative to sliders on the shaft whereby motors for driving the implement are so controlled that the straight movement is restored. With this arrangement there exists the danger that due to soiling the displaceable parts of the measured value pick-up will jam or will be bent and that the contacts between the variable resistors and the sliders will be affected. It is, therefore, an object of the present invention so to design a straight movement control device of the described general character that an increased operational safety will be realized.

This object and other objects and advantages of the invention will appear more clearly from the following specification in connection with the accompanying drawings, in which:

FIG. 1 diagrammatically illustrates a top view of a travelling crane with crane rails and a straight movement control device according to the invention.

FIG. 6 is a view of a portion of a multi-axle rail carriage of a gantry crane with a measured value pick-up.

FIG. 7 shows a top view of the gantry crane of FIG. 6.

FIG. 8 illustrates on a larger scale than that of FIG. 6 a section taken along the line VIII — VIII of FIG. 6.

The straight movement control device according to the present invention is characterized primarily in that measured value pick-ups are used which, relative to the rail are contact free and act inductively or capacitively in response to relative transverse movement between the pick-ups and the rail. The pick-ups are connected to an electronic measured value emitter which, on the basis of the received measured values, emits a signal for influencing the control when the rail carriage starts to occupy an inclined position relative to the rail. The size of the signal varies in conformity with the amount the distance between the feelers of the measured value pick-ups and the rail changes.

This arrangement according to the present invention brings about the advantage that also when the implement operates in a dirty environment, the straight movement control device will work properly so that damages and accidents caused by an inclined movement of the respective implement will be avoided.

This object will also be realized when the control device according to the invention is used only for correcting a straight movement control device known per se.

Figure 1:
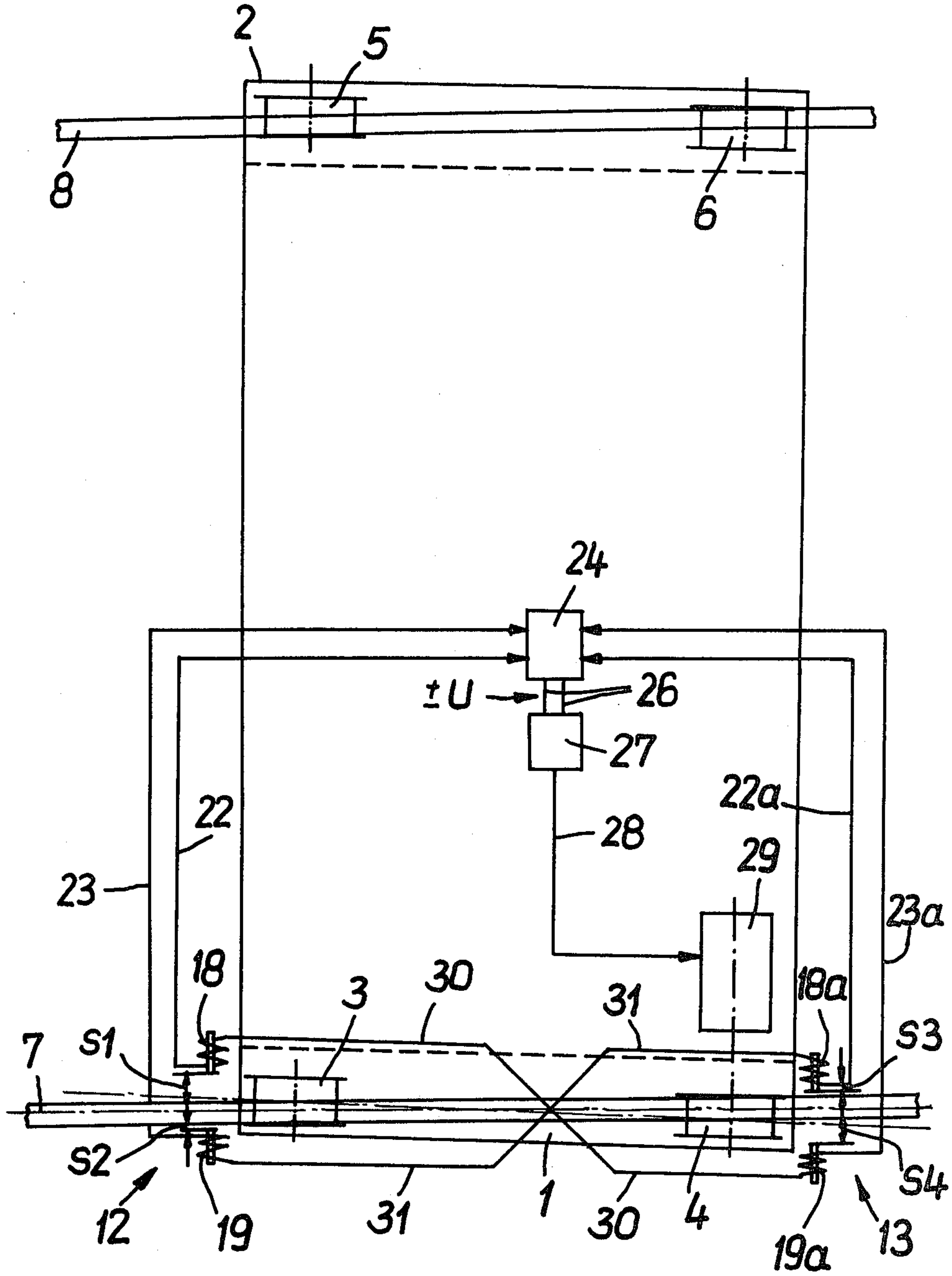
Figure 2:
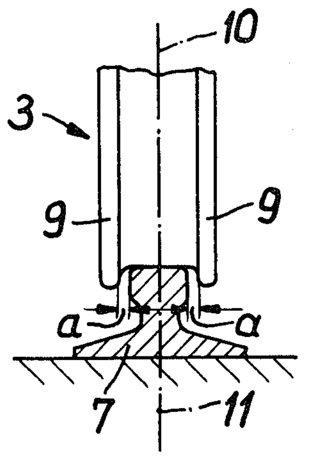
FIG. 2 is a cross section through a crane rail and shows a view of a portion of a crane wheel.
Figure 3:
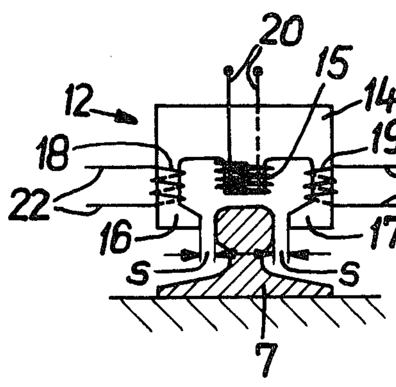
FIG. 3 is a cross section through a crane rail and shows a view of a measured value pick-up.

Referring now to the drawings in detail, the head beams 1, 2 of a travelling crane according to FIG. 1 rest on the crane rails 7, 8 by means of four wheels provided with flanges, which wheels are located at the ends of the beams 1, 2. The distance between the flanges 9 of the wheels is greater than the width of the heads of the crane rails 7, 8. FIG. 2 shows that a wheel, for instance wheel 3, is arranged on the crane rail 7 symmetrically to the latter. This means that the vertical longitudinal central plane of the wheels 3, 4 and of the pertaining head beam 1 coincide with the vertical longitudinal central plane of the crane rail 7. Accordingly, the flanges 9 are evenly spaced by the distance *a* from the lateral surface of the head of the crane rail 7.

At the ends of the head beam 1 there are provided two inductive measured value pick-ups 12, 13. Each pick-up 12, 13 has a yoke-shaped magnetic core 14 which is mounted on the head beam, and in spaced relationship to the respective wheel 3, 4 extends from above and from both sides around the head of the crane rail 7 in spaced relationship thereto. One pole of the magnetic core 14 is arranged above the head of rail 7 and carries an exciting winding 15 which is connected to an alternating voltage. Two downwardly extending legs of the magnetic core 14 form pole shoes 16, 17 which in the illustrated symmetrical position of the magnetic core 14 with regard to rail 7 have the same distance *s* from the head of the rail. The two legs of the magnetic core 14 are provided with two measuring coils 18, 19.

Figure 4:
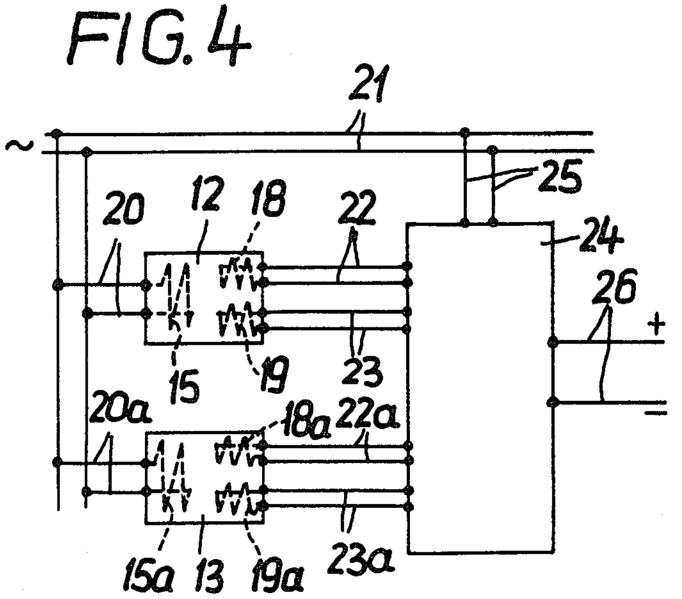
FIG. 4 shows an electric circuit for use in connection with the present invention.

FIG. 4 shows that the exciting winding or coils 15 and **15*a* of the measured value pick-ups 12, 13 are by means of conductors 20, 20*a* connected to an alternating voltage network 21. The measuring coils 18, 19 of the measured value pick-up 12 are by conductors 22, 23 connected to a measured value emitter 24, which means to an electronic evaluation device. The measuring coils 18*a* and 19*a* of the measured value pick-up 13 are by conductors 22*a* and 23*a* connected to the measured value emitter 24. The emitter 24 receives its energy through lines 25 from the alternating voltage network 21. The measured value emitter 24 is furthermore by means of conductors 26 connected to a control 27 illustrated in FIG. 1. This control is by means of conductor means 28 connected to one of the motors by means of which, for instance, one or more of the crane wheels on one side of the crane are driven. As an example, this motor may be the motor 29 which drives the wheel 4**.

FIG. 1 illustrates that the crane with the head beams 1, 2 occupies relative to the crane rails 7, 8 such an inclined position as is permitted by the play between the flanges 9 of the wheels 3, 4, 5, 6 and the heads of the crane rails. This inclined position may have been caused by various factors. For instance, the wheels on different sides of the crane may not be driven uniformly or synchronously. Furthermore, the driven wheels may have worn on one crane side to a greater extent than the wheels on the other crane side, or the friction between wheels and rail on the two sides of the rail may be different. The inclined position of the crane brings about that the pole shoes of each measured value pick-up, for instance 16, 17 are differently spaced from the head of the crane rail 7. The different distances of the pole shoes 16, 17 of the measured value pick-up 12 from the rail head are designated with the characters $s_1$ and $s_2$. The corresponding distances of the pole shoes of the measured value pick-up 13 are designated with the characters $s_3$ and $s_4$. $s_1$ is considerably greater than $s_2$ and equals the diagonally oppositely located distance $s_4$, whereas the distances $s_2$ and $s_3$ which are located diagonally opposite to each other are equal. The measuring coils 18, 19*a* and 19, 18*a* which are located diagonally opposite to each other are serially arranged by the lines 30, 31 crossing each other. In contrast thereto, with the circuit according to FIG. 4, a corresponding serial arrangement is effected within the measured value emitter 24.

Figure 5:
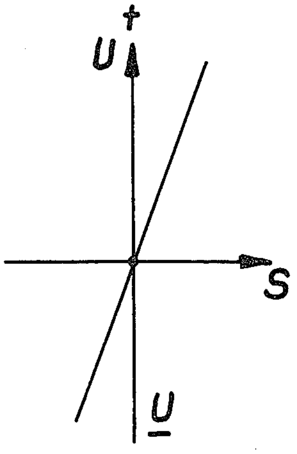
FIG. 5 is a diagram.

Inasmuch as, accordingly with an inclined position of the crane, the air gap, for instance between the pole shoe 16 of the measuring value emitter 12 and the head of the rail 7, is increased it will be appreciated that the magnetic flux in the leg of the magnetic core 4 which carries the measuring coil 18 decreased to such an extent that the currents induced in the measuring coil 18 will decrease. On the other hand, the magnetic flux in the leg carrying the measuring coil 19 increases to such an extent that in the coil 19 greater currents are induced due to the decrease in the air gap between the pole shoe 17 and the rail head. The decrease in the currents induced in the measuring coils 18 and 19*a* as well as the increase in the currents induced in the measuring coils 19 and 18a add to each other so that a corresponding strong effect in the measured value emitter 24 is realized. The emitter 24 conveys direct current voltages U through conductors 26 to the control 27. These voltages U are, for instance, positive with the inclined position of the crane shown in FIG. 1 and are negative with the oppositely inclined position. The magnetude of the voltage U is proportional to the respective angle by which the crane is inclined relative to the crane rails 7, 8. With a precise straight movement of the crane, accordingly, the voltage U equals zero. Corresponding to the voltages U received by the measured value emitter 24, the control 27 emits signals S to the control device for the motor 29, said signals may, in conformity with FIG. 5, be proportional to the voltages U. This is effected in such a way that the speed of the motor 29 is reduced when the wheels 3, 4 run ahead with regard to the wheels 5, 6 whereas the speed of the motor 29 is increased when the wheels 3, 4 trail the wheels 5, 6.

The control 28 is ineffective when the crane is displaced transverse to the crane wheels 7, 8 parallel to itself. For instance, with a displacement of the crane in the direction toward the crane rail 8, the distance between the pole shoes pertaining to the measuring coils 19 and 19*a* and the head of the rail 7 decreases to the same extent whereas the distance between the pole shoes pertaining to the measuring coils 18 and 18*a* and the rail head increases to the same extent. Consequently, the total of the respective distances of two pole shoes arranged diagonally opposite to each other are the same prior and after the respective displacement of the crane.

Also when the crane passes through a curve, the straight movement control device will not respond.

In addition to moving cranes according to FIG. 1, the invention may also be used in connection with large gantries. FIG. 7 shows a top view of a gantry of large span as it is used, for instance, in ship yards for transporting ship sections. The bridge beam 32 has one end resting in a one point joint 33 on a pendulum support 34, whereas the other end of the bridge beam 33 is connected to a fixed support 35. The pendulum support 34 as well as the fixed support 35 have carriages with thirtytwo wheels 39 each which in pairs are combined into bogies. Each two bogies support one rocker 41 in bearings 42 with vertical rotary axles. Each two rockers 41 are interconnected by a larger rocker 43, and each two rockers 43 are interconnected by a compensating beam 44. The two compensating beams 44 are on each side of the crane interconnected by a beam 45, which beam 45 forms the foot of the respective support. The connection between the beams 45, 44 and the rockers 43, 41 is effected by means of joint bolts 46, 47, 48 the center lines of which are located transverse to the driving direction and for all practical purposes do not permit lateral pivoting movements of the beams and rockers relative to each other. FIG. 6 shows driving motors 49 for individual wheels 39.

As will be seen from FIG. 7, the rail carriage 50 below the fixed support 35 runs ahead of the carriage 53 below the pendulum support, assuming that the gantry moves on the rails 51, 52 from the right-hand side to the left-hand side. Consequently, the bridge beam 32 has placed itself at an incline to its originally rectangular position with regard to the rails 51, 52. Accordingly, also the carriage 50 is inclined to the rail 51. This inclined position is not greater than the play between the flanges of wheels 39 and the head of rail 51 will permit. FIG. 8 shows that the two wheels 53, 54 of the bogie 40 located at one extreme end of the carriage have one flange each just engaging the rail head. The wheels 55, 56 of the adjacent bogie 40 have not quite moved to such an extent that one of the flanges engages the rail head transverse to the latter. The vertical longitudinal central plane 57 of the carriage 50 is located at an incline to the vertical longitudinal central plane 58 of rail 51.

A measured value pick-up or recorder corresponding to the measured value pick-up or recorder 12 is arranged at the outer end of the bogie 40. FIG. 8 shows only the two legs of the magnetic core with the pole shoes 16, 17 arranged on both sides of the rail head. According to the transverse movement of the bogie 40 relative to the rail 51, the spacing of the pole shoe 16 from the rail head is greater than the spacing of the pole shoe 17 therefrom. In a corresponding manner, at the outermost end of that bogie which is located at the opposite end of the rail carriage 50 there is provided a measured value pick-up of the type of the measured value pick-up 13. Both pick-ups transmit measured values which correspond to the inclined position of the carriage 50 relative to the rail 51 to a non-illustrated measured value emitter. This measured value emitter influences a control in such a way that the latter emits signals to the control devices of the drive motors of the rail carriage 53 below the pendulum support 34. These signals bring about an acceleration of the rail carriage until the bridge beam 32 is again vertically adjusted to the rails 51, 52, and consequently the rail carriage 50 is again located parallel to the rail 51. It is, of course, also possible that the control influences the control devices of the motors 49 which pertain to the rail carriage 50 provided below the fixed support 35. In this connection, in case of the rail carriage 50 running ahead of the rail carriage 53, it is necessary that the carriage 50 be retarded.

At any rate, the straight movement control is effected without the occurrence of a greater inclination of the crane carriage than corresponds to the play between the lateral guiding means and the rail head. These guiding means consist either of the flanges of the wheels or of lateral guiding rollers when wheels without flanges are used.

Figure 9:
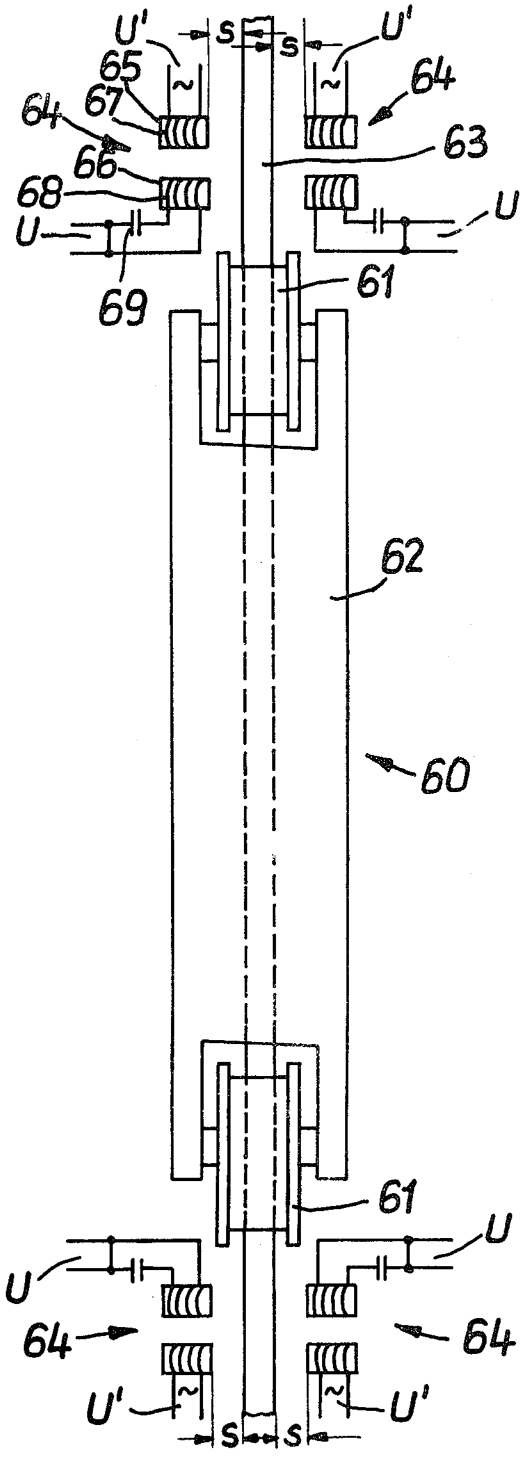
FIG. 9 is a top view of a rail carriage with measured value pick-ups of a modified design.

FIG. 9 shows a top view of the rail carriage 60 with two flanged wheels 61. Two oscillators 64 each are arranged at both sides of the carriage support 62 on both sides of the rail 63. Each oscillator has two coil cores 65, 66 which are so arranged that their center lines extend at an angle of 90° to the vertical longitudinal central plane of the rail 63 and in the illustrated position of the rail carriage 50 are spaced from the rail head by a distance *s*. Each of the coil cores 65 has a winding 67 which is connected to an alternating voltage U. Each coil core 66 has a winding 68 which together with a condenser 69 has an oscillating circuit. Each of the oscillating circuits furnishes a voltage U to a measured value emitter which corresponds to the measured value indicator 24 in FIGS. 1 and 4.

Figure 10:
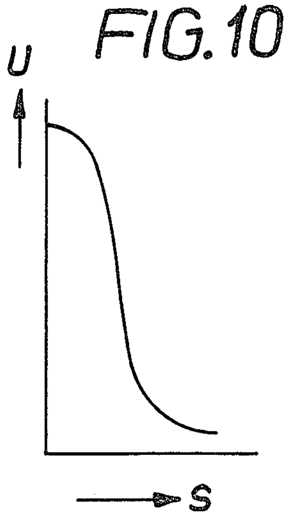
FIG. 10 illustrates a graph pertaining to the rail carraige of FIG. 9.

When the carriage inclines with regard to the rail 63, the distance of the coil cores 65, 66 at one end of the carriage frame increases on one side and also at the other end of the carriage frame on the opposite side, whereas the distances of the pairs of coil cores 65, 66 which are located opposite to each other from the rail decreases. As will be seen from FIG. 10, the decrease in the distances *s* results in that the voltage U approaches the resonance range of the oscillating circuit and consequently increases. The difference between the voltage U greatly increased in this manner and the corresponding smaller voltage at the oppositely located side of the rail acts upon the measured value emitter 24 in such a way that the running ahead of one of the rail carriages which causes the inclination of the rail carriage is reversed relative to the other rail carriage.

Figure 11:
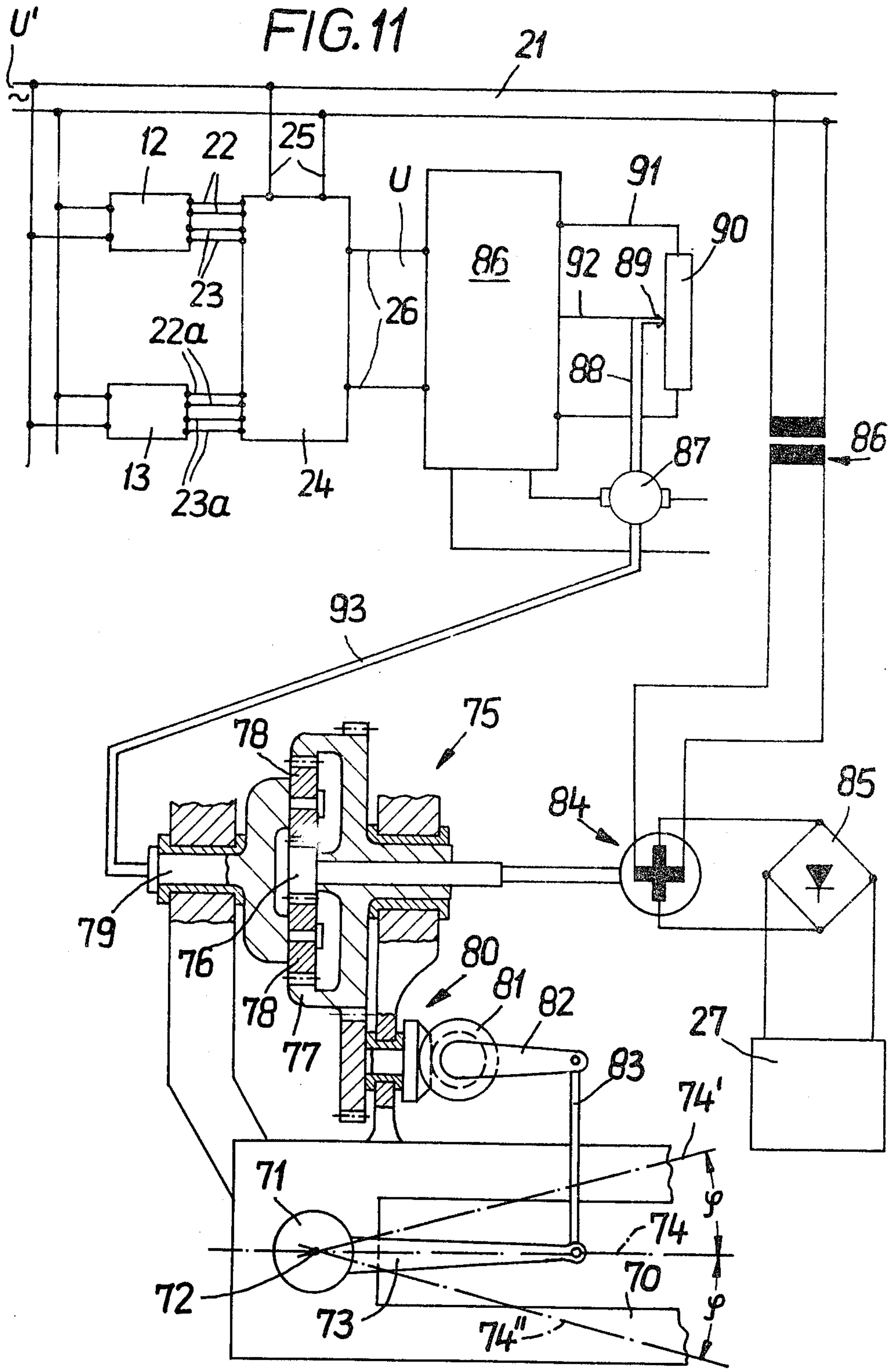
FIG. 11 illustrates a circuit for applying the control device of the invention for correction of a straight movement control device.

FIG. 11 shows an instance in which for the straight movement control, for instance a gantry, there is used a heretofore known device which is merely subjected to a correction control by the control device according to the invention.

FIG. 11 shows in top view one end of a double wall bridge beam of a gantry. This end rests upon the tip of a pendulum support which moves with a carriage on one rail. This tip of the pendulum support has a bearing 71 about whose vertical axis 72 the bridge beam 70 can be pivoted relative to the pendulum support. Fixedly connected to the pivot of bearing 71 is a control arm 73 the center line of which in the normal position of the bridge beam, in other words when the bridge beam is at a right angle to the rail, is located in the vertical longitudinal central plane 74 of the bridge beam 70. The numbers 74' and 74'' indicate that during an inclination of the bridge beam 70 relative to the pendulum support, the vertical longitudinal central plane of the bridge beam forms with the center line of the control arm 73 an angle $\psi$.

A planetary gear transmission 75 is arranged on the bridge beam 70. This transmission has an inner sun wheel 76, a ring wheel 77 and three or four planetary gears 78 which mesh with the teeth of gears 76 and 78 and are mounted on a planetary gear carrier 79. The ring wheel 77 is turned by means of a transmission 80 through the intervention of a gear 81, a lever arm 82 being mounted on gear 81. This arm 82 is connected to the control arm 73 by means of a rod 83. Consequently, the control arm 73 engages one entrance of the planetary gear transmission 75.

The exit of the planetary gear transmission is derived from the inner sun wheel 76. This exit is connected with the rotatable part of an adjustable transformer 84. Depending on the adjustment of this transformer, a different voltage is furnished to a rectifier 85, which voltage is applied to the control for influencing the driving units of the rail carriages.

The adjustable transformer 84 is in its turn connected through a transformer 86 to an alternating current network 21.

If it is assumed that the planetary gear carrier 79 is held stationary it will be appreciated that whenever, during the running ahead of one of the two rail carriages relative to the other one, the bridge beam 70 will be inclined and the control arm 82 will pivot in conformity with the respective angle $\psi$.

This results in adjustment of the transformer 84 and the influencing of the control 27 through the rectifier 85 in such a way that, due to the delay or acceleration of one of the driving units of the rail carriages, the inclination of the bridge beam will be reversed.

However, it may occur that the bridge beam when, for example, being exposed to extensive sun radiation, curves when viewed from above. This curvature brings about that the control arm 73 leaves the vertical longitudinal central plane 74 of the bridge beam 70.

According to the then forming angle $\psi$, the transformer 84 will be adjusted and, thus, a control of the respective driving unit of one rail carriage would be effected even though no running ahead of one rail carriage relative to the other had occurred.

Inherent to such curving of the bridge beam, an inclination of the rail carriage which is fixedly connected to the bridge beam would occur relative to the respective rail. Faulty control can, however, be prevented by the application of a straight movement control device as it has been described in connection with FIGS. 1–8.

The two measured value pick-ups 12, 13 which are connected to the network 21 emit their signals through conductors 22, 23 and **22*a*, 23*a* to the electronic measured value emitter 24 which, by means of conductors 25, is connected to the network 21**.

The measured value emitter 24 furnishes through the conductors 26 to the compensation amplifier 86 a signal voltage U. A servo motor 87 is connected to the amplifier 86. Shaft 88 of said amplifier 86 brings about an adjustment of a slider 89 along a potentiometer 90 which has at least one end thereof connected to the compensation amplifier 86 by a conductor 91.

The amplifier 86 is, furthermore, through a conductor 92 connected to the slider 89. As long as voltage between the connections of the conductors 91, 92 differs from the voltage U at the connections of conductors 26 the armature of the servo motor 87 will turn.

Shaft 93 of the servo motor 87 is machanically connected to the planetary gear input member 79. The transmission ratios are so selected that by means of the servo motor 87 which is connected to input 79 of the planetary gear transmission 75, the adjustment of the transformer 86, which was effected by rotation of inner sun wheel 76 in response to movement of control arm 73, is reversed. The control influences from (*a*) the pick-ups on one carriage which is fixed to the beam, and (*b*) the control arm 73 connected to the other carriage which is pivoted on the beam are, then, additive when one carriage runs ahead of the other and subtractive (cancel) when the beam bends in a horizontal plane and no carriage runs ahead.

Instead of the planetary gear transmission which is shown only diagrammatically, any other superposed transmission with inputs and at least one output may be employed.

Such transmission may in any other manner be designed mechanically or may also act hydraulically or electrically.

It is, of course, to be understood that the present invention is not limited to the specific showings in the drawings but also comprises any modifications within the scope of the appended claims.

What is claimed is:

1. A control device for causing an implement such as a crane having laterally spaced wheeled carriages rollingly supported on respective laterally spaced tracks to remain in parallel with itself while moving along the tracks; said device comprising in combination; pick-up means on at least one carriage spaced longitudinally along the carriage and also spaced laterally from the respective track and each operable to develop a signal in conformity with lateral movement of the pertaining region of the carriage on the respective track as brought about by movement of said implement out of a position of parallelism with itself, a comparator connected to receive said pick-up signals and operable to develop a control signal in conformity with the difference therebetween, and control means connected to receive said control signal and operable in conformity with said control signal to apply corrective vertical axis influences on said implement tending to restore the implement to said condition of parallelism with itself.

2. A control device in combination according to claim 1 in which each pick-up means comprises a magnetic core having a detector pole shoe opposed to each side of the rail and an exciting pole shoe opposed to the top of the rail, a pick-up coil on each detector pole shoe, and an exciting winding on said exciting pole shoe, said exciting winding when energized establishing respective magnetic fields through said detector pole shoes which vary differentially when the pick-up means and the respective track move relativley in the lateral direction.

3. A control device in combination according to claim 2 in which each pick-up means comprises a pair of cores adjacent the side of the respective rail, a first coil on one core adapted for energization from an alternating current source, a second coil on the other core and oscillator circuit means in which said second coil is connected, said oscillator circuit developing a pick-up signal which varies in conformity with changes in spacing between said cores and said rail.

4. A control device in combination according to claim 3 in which said implement comprises an elongate transverse beam, one of said carriages being fixed to one end of the beam and the other of said carriages being rotatable on a vertical axis on the other end of the beam, a control arm fixed to said other carriage, pick-up means on said one carriage sensitive to movement of said beam out of a condition of parallelism with itself for developing said pick-up signals, geared transmission means having an output operatively connected to said control means for adjustment thereof and a first input adjustable in response to pick-up signals developed by said pick-up means and a second input adjustable in response to movement of said control arm relative to the beam, the effect of said adjustments being equal and opposite when said beam curves in a horizontal plane and being additive when one of said carriages runs ahead of the other thereof.

5. A control in combination according to claim 4 which includes a servomotor, amplifier means connecting the output side of the comparator to said servomotor and means forming a feed back from the servomotor to the amplifier, variable means supplying said control means, and said geared means having said output connected to said variable means for adjustment thereof, said first input of said geared means being connected to said servomotor, and said second input of said geared means being connected to said control arm.

6. A control device in combination according to claim 5 which includes a potentiometer having a slider, said servomotor connected to said slider to effect adjustment thereof when the servomotor turns, an electrical connection from said slider back to said amplifier to control the supply of power to said servomotor, and said servomotor being connected to said first input of said geared means.

7. A control device in combination according to claim 5 in which said variable means comprises a variable transformer having a power supply connected to one side and the other side connected to said control means.

* * * * *